UNITED STATES PATENT OFFICE.

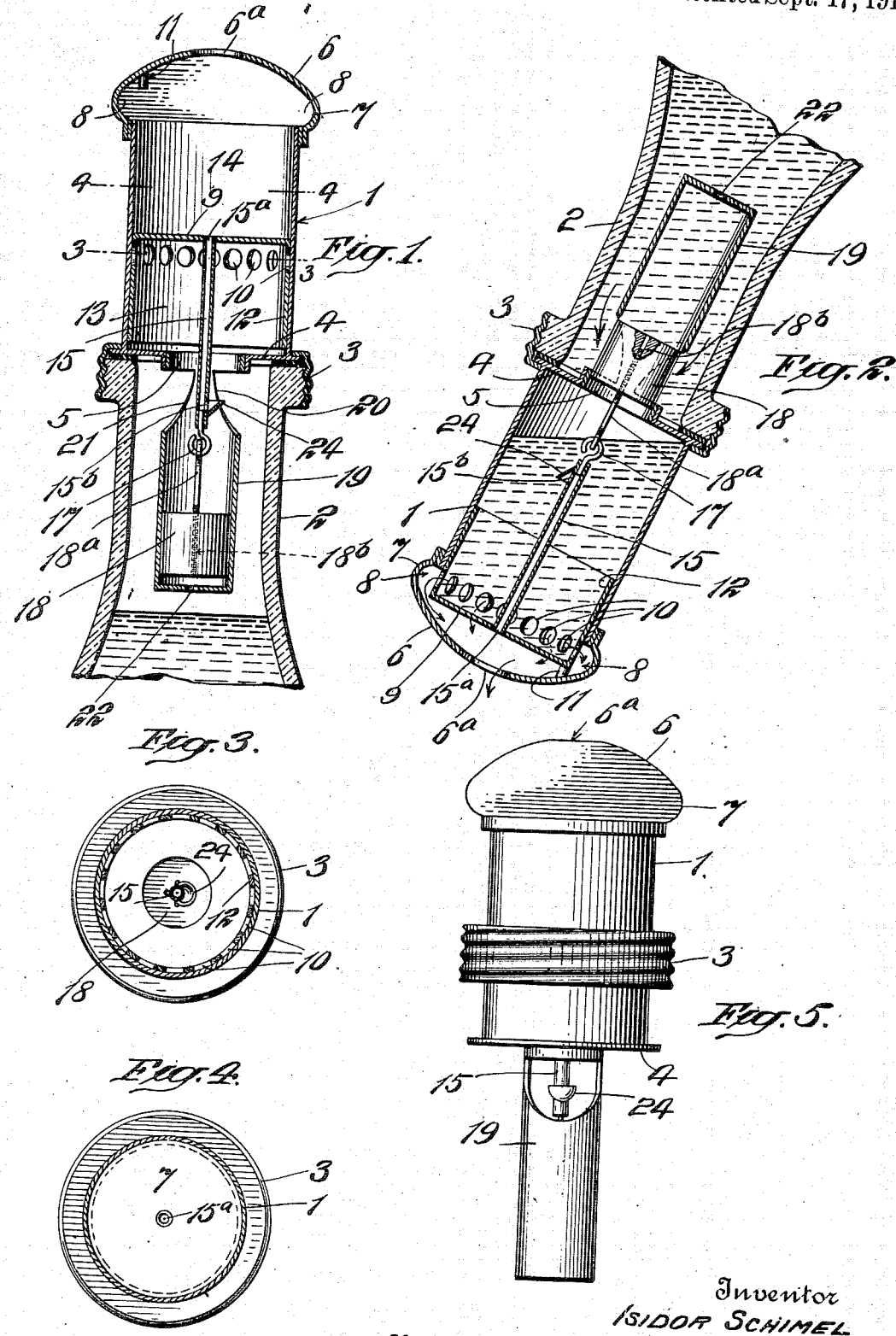

ISIDOR SCHIMEL, OF NEW YORK, N. Y.

MEASURING DEVICE FOR POURED LIQUIDS.

1,279,014.  Specification of Letters Patent. Patented Sept. 17, 1918.

Application filed May 30, 1918. Serial No. 237,373.

*To all whom it may concern:*

Be it known that I, ISIDOR SCHIMEL, citizen of the United States, and resident of New York, in the county of New York and State of New York, have invented certain new and useful Improvements in Measuring Devices for Poured Liquids, of which the following is a specification.

This invention relates to improvements in measuring devices for poured liquids, and comprises an improvement upon the device illustrated in my pending application Serial No. 222,267 filed March 14th, 1918, in which an independent measuring casing is mounted above the neck of a bottle and a piston is reciprocated upon the tilting of the bottle within a chamber in the said casing; and in which furthermore, means are provided for splitting up or dividing the ultimate load or quantity delivered into two well defined and approximately equal parts, viz.: A piston-accelerating load portion which initially flows into the measuring chamber upon the upward tilting of the bottle and a compensating load portion which flows into the measuring chamber during the travel of the piston from its starting to delivering position.

The primary object of my present invention is to provide in a device of the character above specified, speed controlling means for the piston which will act positively and quickly to cause the delivery of an accurately measured load or quantity.

Another object of my invention is to produce a speed controlling device for pistons which will be capable of having its degree of speed accurately controlled and which will move with a uniform speed from its starting to its closing position.

Another object of my invention is to provide means in such a speed controlling device for limiting its extent of movement so as to determine the quantity of liquid to be delivered when utilized in combination with the means for producing uniformity of speed.

Still another object of my invention is the production of a device which will have the fewest possible number of parts and will eliminate springs and the like which readily lose resilience and consequently fail to operate effectively. This enhances the simplicity of the device.

Another object of my invention is to cause the valve for closing the ingress opening to have the additional function of a piston in the speed-controlling means for the main or load delivering piston.

Another object is to provide a cap which will cause a quick distribution of unpoured liquid, that is to say, liquid remaining between the outlet opening and the piston, and to permit a return of such liquid to the bottle.

My invention furthermore consists in the construction disposition and relationship of the various parts of my said device as will be hereinafter more particularly set forth in this specification and illustrated in the accompanying drawings. In the drawings, in which similar reference characters designate corresponding parts throughout the several views.

Figure 1 is a central vertical section of a device embodying my invention attached to a bottle in an upright position;

Fig. 2 is a similar view of the device shown in Fig. 1, the bottle being in a tilted position.

Fig. 3 is a section on the line 3—3 Fig. 1;

Fig. 4 is a section on the line 4—4 Fig. 1, and

Fig. 5 is a side elevation of the device detached from the bottle neck.

Referring now to these drawings, 1 indicates a measuring casing or barrel which is mounted on the neck of a bottle 2 and secured as shown to said bottle by means of a screw threaded ferrule 3 which meshes as illustrated with a screw-thread formed integrally on the bottle neck. The casing 1 is provided at its lower end with a seating portion 4 having an ingress opening 5 and has at its upper end, a cap 6 having an egress aperture 6ª provided with a bulged-out shoulder 7 extending circumferentially around the casing 1 so as to provide a channel 8 for the purpose hereinafter set forth. A piston 9 is arranged within the casing about midway between the ingress opening and the cap 6 so that when its movement is properly controlled, the load ultimately delivered will be split-up or divided into two well defined parts, viz., an initial, piston-accelerating load portion which flows into the casing upon the reversal of the bottle, and a compensating load portion which is delivered to or flows into the casing while the piston is traveling from its starting to its load-delivery portion.

The wall of the said piston is provided as illustrated with a series of apertures 10 located contiguous to the top of the piston and adapted when the piston is moved to its uppermost position shown in Fig. 2 to permit liquid to issue therefrom through the channel 8 around the top of the piston and through the egress opening 6. Suitable means for limiting the extent of movement of the piston toward the outlet is provided and as shown, a stop 11 is arranged on the inner surface of the cap. This stop is so arranged as to permit the openings 10 to register with the channel 8 to permit the most effective egress of liquid through the channel as above specified.

The said piston, as shown, has its side wall 12 extending downwardly a predetermined distance so as to provide within the casing 1, a chamber 13 between the piston 9 and the seat 4 so as to enable an initial load to be delivered to the measuring casing 1 below the said piston and also to provide above the said piston, another chamber 14 which I shall term a compensating load space or chamber. Said piston 9 also carries a gravity or weight valve 18 the primary function of which is to close the ingress opening 5 when the piston 9 has traveled through the chamber 13 and begins to discharge liquid through the channel 8. The valve 18 is connected to the piston 9 by a piston stem 15 which extends downwardly below the casing seat 4 through the ingress opening 5 and is as shown, connected at its lower end by means of a flexible joint 17 and stem 18ᵃ to the valve 18 which is in the form of a cylindrical weight and is adapted to function as a speed-controlling piston and to reciprocate within a casing 19 connected in any suitable way with the casing 1 and having its wall preferably in alinement or registration with the ingress opening 5 to permit the valve when moved in one direction to close the ingress opening 5. Said casing is provided at its upper end with openings 20, 21 at opposite sides thereof to admit the liquid to the ingress opening 5 of the casing. Said casing 19 also is provided with a speed regulating aperture 22 for the admission of liquid behind the cylindrical valve piston 18 the size of which opening will control the speed of the valve-piston 18.

The extent of movement of the valve or piston 18 within the casing 19 is limited or regulated by means of a screw-threaded connection 18ᵇ between the valve-piston 18 and its stem 18ᵃ.

The stem 15 is as shown, hollow and has a central bore communicating with the chamber 14 at one end as at 15ᵃ and an outlet 15ᵇ which extends in the center of the piston 9 as at 15ᵃ within the casing 19 at its opposite end, the outlet 15ᵇ being protected by a shield 24 extending across the mouth thereof.

The operation of the device is as follows:—

Assuming the device to be in position illustrated in Fig. 1, attached to the neck of the bottle 2, when the bottle is tilted into the position indicated in Fig. 2, the liquid in the bottle will enter the chamber 13 below the piston 9 through the openings 20 and 21 and the ingress opening 5, and at the same time liquid will enter through the speed controlling aperture 22 in back of the valve piston 18 so as to permit the said valve piston to move freely within the casing 19. It will be understood, of course, that the speed of the valve 18 may be controlled by enlarging or decreasing the size of the aperture 22, and that the said piston valve will only travel so fast as liquid enters the casing 19 in back of such piston. Obviously, therefore, a speed control device is produced which may be positively controlled and which does not depend upon springs or like parts which soon wear out, lose their resiliency and become ineffective. As the piston 9 moves into the position shown in Fig. 2, a compensating load is delivered to the measuring chamber during the movement of the valve or piston 18 from the position indicated in Fig. 1 to said position indicated in Fig. 2. In this last mentioned position, the said valve seats upon the ingress opening 5 and prevents a further admission of liquid to the measuring chamber. When the piston has made its full stroke toward the egress opening, it will be stopped by the stop 11 in the position indicated in Fig. 2 in which position the openings 10 register with the circumferential channel 8 in the cap 6 so that liquid will flow through such apertures 10 and through the channel 8 around the top of the piston and through the egress opening 6. Because of the conformation of the cap 6 and the formation therein of the circumferential side-channel 8, any liquid which is left unpoured by the user and remains between the outlet 6 and the chamber 14 below the piston 9 will because of this side-channel be quickly distributed and admitted to said chamber 14 from which it will be returned to the bottle. Air will be admitted from the egress opening through the vent bore in the stem 15 to permit a rapid discharge of the contents of the measuring chamber and a certain amount of air will also be admitted through some of the openings 10.

If it is desired to deliver a smaller load the set screw 18ᵇ will be screwed inwardly a suitable distance so as to limit the extent of movement of the valve 18.

It will be apparent that by my invention I have produced a speed controlling device for the piston which will act positively and quickly to cause the delivery of an accurately measured load and which will be capable of having the degree of speed accurately controlled and which will furthermore, be capable of being moved with a uniformly and relatively high speed from the starting to the closing position.

It is also apparent that the parts of the device as now constituted are not likely to get out of order, and furthermore, that the extent of movement of the valve may be limited to fix the quantity of liquid which may be delivered with a predetermined controlling opening.

Having now described my invention, I claim:

1. The combination with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing, and a speed-controlling casing surrounding said valve and adapted to control the movement thereof.

2. The combination with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing; a speed-controlling casing within which said valve extends and means for regulating the degree of speed of said valve within said speed controlling casing.

3. The combination with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing; a speed-controlling casing within which said valve extends, means for regulating the degree of speed of said valve within said speed controlling casing, and means for regulating the extent of movement of said valve within said casing.

4. The combination with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing; a speed-controlling casing within which said valve extends, and a hole in said casing at the rear of said valve.

5. The combinaton with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing; a speed-controlling casing within which said valve extends, means for regulating the degree of speed of said valve within said speed controlling casing, and a screw threaded connection between said valve and the piston for regulating the extent of movement of said valve and piston.

6. The combination with a suitable bottle having a neck portion, of a device for measuring liquid poured from said bottle, embodying a casing having ingress and egress openings for the liquid, a piston movable within said casing, a valve stem connected with said piston at one end and having a valve at its opposite end adapted to close the ingress opening into said casing, said casing being provided with a circumferential channel between the egress opening and the piston extending outwardly beyond the periphery of the piston when the device is in inverted position.

7. The combination with a suitable bottle having a neck portion, of a device for measuring liquid poured from said bottle, embodying a casing having ingress and egress openings for the liquid; a piston movable within said casing, a valve stem connected with said piston at one end and having a valve at its opposite end adapted to close the ingress opening into said casing; a detachable cap mounted on the casing and having a circumferential channel between the egress opening and the piston extending outwardly beyond the periphery of the piston when the device is in inverted position.

Signed at borough of Manhattan, city of New York, in the county of New York and State of New York, this 29th day of May, A. D. 1918.

ISIDOR SCHIMEL.

Witnesses:
JOSEPH F. O'BRIEN,
JACOB MARAZ.